(12) United States Patent
Fisher et al.

(10) Patent No.: US 9,667,552 B2
(45) Date of Patent: May 30, 2017

(54) REAL-TIME SLA IMPACT ANALYSIS

(75) Inventors: Bradford Austin Fisher, Chapel Hill, NC (US); Randy Allan Rendahl, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1582 days.

(21) Appl. No.: 10/672,777

(22) Filed: Sep. 26, 2003

(65) Prior Publication Data
US 2005/0071458 A1    Mar. 31, 2005

(51) Int. Cl.
| | |
|---|---|
| G06F 15/173 | (2006.01) |
| G06F 15/16 | (2006.01) |
| H04M 3/42 | (2006.01) |
| H04L 12/851 | (2013.01) |
| H04L 12/813 | (2013.01) |
| H04L 12/24 | (2006.01) |

(52) U.S. Cl.
CPC .......... H04L 47/24 (2013.01); H04L 41/5003 (2013.01); H04L 41/5035 (2013.01); H04L 47/20 (2013.01); H04L 41/024 (2013.01); H04L 41/06 (2013.01)

(58) Field of Classification Search
CPC ............. H04L 41/5009; H04L 41/5003; H04L 41/5019
USPC ........................................................ 709/224
See application file for complete search history.

(56) References Cited

U.S. PATENT DOCUMENTS

| | | | |
|---|---|---|---|
| 5,893,905 A * | 4/1999 | Main et al. ...................... | 705/11 |
| 6,092,095 A | 7/2000 | Maytal | |
| 6,687,495 B2 * | 2/2004 | Bhatia et al. ............... | 455/414.1 |
| 6,701,342 B1 * | 3/2004 | Bartz .................. | H04L 41/5003 370/395.21 |
| 6,925,493 B1 * | 8/2005 | Barkan et al. ................ | 709/223 |
| 2002/0083166 A1 * | 6/2002 | Dugan et al. ................. | 709/223 |

FOREIGN PATENT DOCUMENTS

WO    WO 00/72183    11/2000

* cited by examiner

*Primary Examiner* — Phuoc Nguyen
*Assistant Examiner* — Kishin G Belani
(74) *Attorney, Agent, or Firm* — Steven M. Greenberg, Esq.; CRGO Law

(57) ABSTRACT

A system, method and apparatus for performing a real-time service level agreement (SLA) impact analysis. In the system of the invention, a service level manager can be programmed to establish a plurality of SLAs directly implicating selected resources. A relationship database further can be configured for coupling to one or more management applications programmed to manage the selected resources. Finally, a modeling and evaluation system can be communicatively coupled to the relationship database and the service level manager and programmed to perform a real-time SLA impact analysis based both upon resources directly implicated by the SLAs and also upon resources which are related to the resources directly implicated by the SLAs.

8 Claims, 2 Drawing Sheets

REAL-TIME SLA IMPACT ANALYSIS

BACKGROUND OF THE INVENTION

Statement of the Technical Field

The present invention relates to the field of policy based differentiation and more particularly to the real-time monitoring of the enforcement of the terms of a service level agreement (SLA).

Description of the Related Art

The modern global network can be viewed as a complex interweaving of multiple network technologies, server platforms, client capabilities and application requirements. The vast majority of network technologies handle device requests indiscriminately. That is, regardless of the identity of the requester or the type of request, each device request can be processed with equal priority. Given the exponential increase in network traffic across the Internet, however, more recent network-oriented computing devices have begun to provide varying levels of computing services based upon what has been referred to as a "policy based service differentiation model".

In a policy based service differentiation model, the computing devices can offer many levels of service where different requests for different content or services which originate from different requestors receive different levels of treatment depending upon administratively defined policies. In this regard, a service level agreement (SLA) can specify a guaranteed level of responsiveness based upon a predefined policy. More particularly, the SLA is a contract that specifies an agreement between a service provider and customer regarding a level of service to be provided by the service provider to the customer in respect to a specific resource.

The policy based service differentiation model is the logical result of several factors. Firstly, the number and variety of computing applications which generate requests across networks both private and public has increased dramatically in the last decade. Each of these applications, however, has different service requirements. Secondly, technologies and protocols that enable the provision of different services having different levels of security and quality of service (QoS) have become widely available. Yet, access to these different specific services must be regulated because these specific services can consume important computing resources such as network bandwidth, memory and processing cycles. Finally, business objectives or organizational goals can be best served when discriminating between different requests rather than treating all requests for computer processing in a like manner.

Within the modern enterprise, the enterprise can receive a substantial benefit for effectively providing differentiated service to different customers and different data so that some customers and data receive a higher level of service than other customers and data on the network. That is to say, where the enterprise satisfies the expected service level of a valued customer, the enterprise can retain the customer. Conversely, where the enterprise fails to satisfy the expected level of service of a valued customer, the enterprise likely can lose the customer. Hence, differentiated service can be an important component of e-commerce inasmuch as a customer always can be viewed as merely "one click away" from a competitor's system where response times falter.

Accordingly, the enforcement of the terms of an SLA can be of paramount importance in managing the customer service relationship. To that end, service level management systems have become commonplace in the enterprise. A service level management system can track services provided to customers and compare the delivery of services to the service terms of a corresponding SLA. Performance metrics can be collected over time in respect to the resources associated with the SLA and the metrics can be evaluated to determine if any of the terms of the SLA have been violated.

The evaluation of performance metrics can be performed in the context both of a historical timeframe where the SLA compliance is determined after the fact, and also in real-time responsive to the occurrence of events in the monitored system. In the case of real-time evaluation, the performance metrics can be used to determine the impact of the event upon the terms of the SLA immediately after the occurrence of the event. Traditionally, service level management systems process real-time events at the individual resource level forming a part of the service to determine if the SLA with respect to the service has been impacted in the immediate sense, or whether the SLA will be impacted in the future. Still, there are many other factors within the enterprise that can cause an immediate or future impact on the satisfaction of the terms of an SLA, but in a more indirect manner that would not be exposed through just individual resources associated with an SLA.

SUMMARY OF THE INVENTION

The present invention addresses the deficiencies of the art in respect to providing a real-time impact analysis of the effect of an event in an underlying resource upon the terms of an SLA and provides a novel and non-obvious method, system and apparatus for performing a real-time SLA impact analysis. In a method for performing a real-time SLA impact analysis, an event arising from a specific resource can be detected and it can be determined whether based upon the event the specific resource cannot perform adequately to meet a term within an SLA which directly implicates the specific resource. Significantly, and unlike prior art attempts at real-time SLA impact analysis, it can be further determined whether based upon the event the specific resource inhibits other resources from performing adequately to meet a term within the SLA which does not directly implicate the specific resource, but directly implicates the other resources.

In a system of performing a real-time SLA impact analysis, a service level manager can be programmed to establish a plurality of SLAs directly implicating selected resources. A relationship database further can be configured for coupling to one or more management applications programmed to manage the selected resources. Finally, a modeling and evaluation system can be communicatively coupled to the relationship database and the service level manager and programmed to perform a real-time SLA impact analysis based both upon resources directly implicated by the SLAs and also upon resources which are related to the resources directly implicated by the SLAs.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a real-time SLA impact analysis system, method and apparatus. In accordance with the inventive arrangements, relationships can be established between interdependent resources relied upon by managed applications monitored by a service level management system. Subsequently, upon receiving an event relating to one of the resources, the impact of the event can be analyzed not only in respect to the enforcement of an SLA which specifies the related resource directly, but also in respect to the enforcement of an SLA which specifies a resource which depends upon the related resource.

Figure 1:
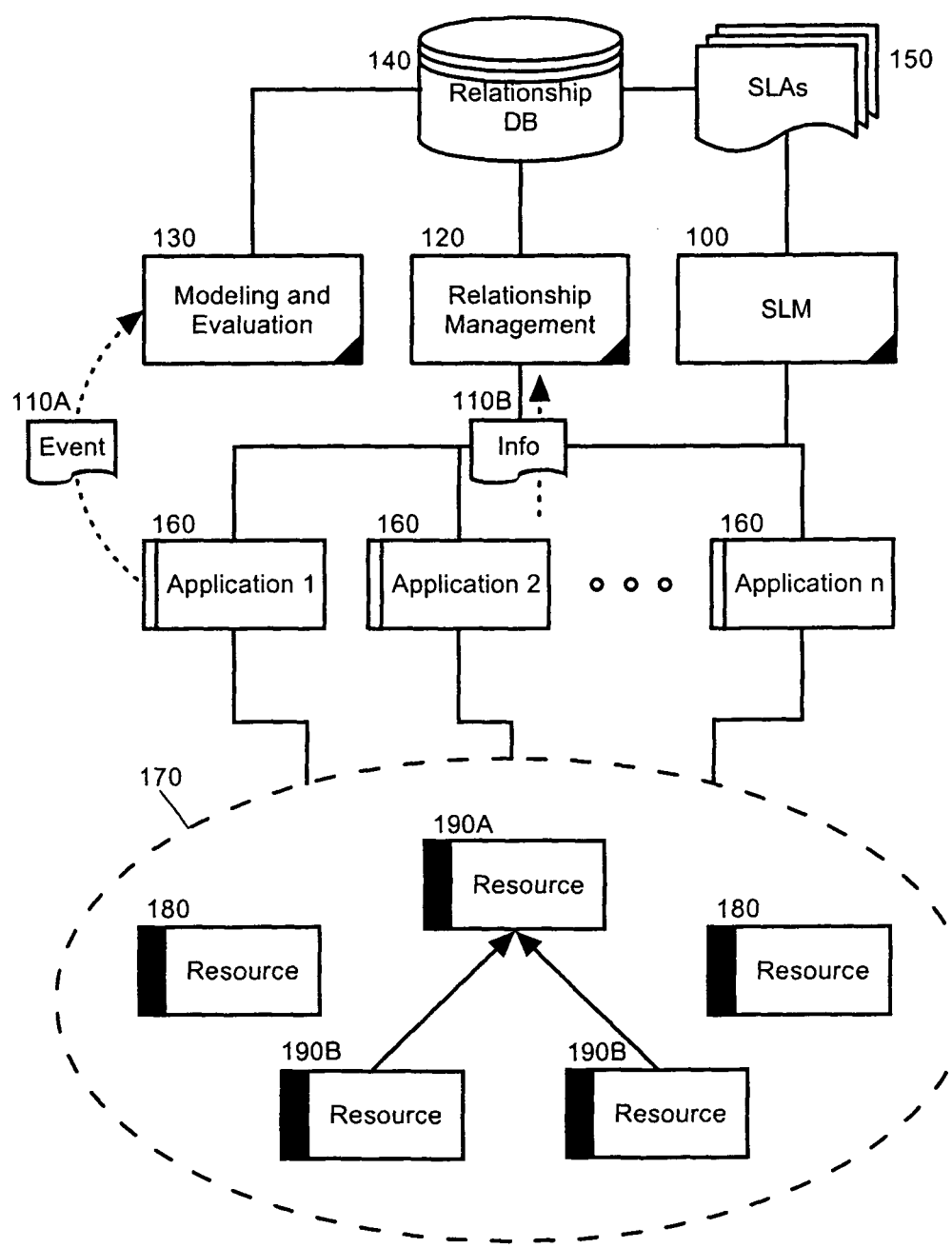
FIG. 1 is schematic illustration of a service level monitoring system configured for real-time SLA impact analysis in accordance with the present invention; and, FIG. 2 is a flow chart illustrating a process for performing a real-time SLA impact analysis in the service level monitoring system of FIG. 1.

FIG. 1 is schematic illustration of a service level monitoring system configured for real-time SLA impact analysis in accordance with the present invention. The service level monitoring system can include a service level manager 100 programmed to establish SLAs 150 in respect to one or more of the resources 170. The service level monitoring system further can include one or more management applications 160 communicatively coupled to selected ones of the resources 170. The management applications 160 can store information 110B regarding the managed resources 170 in one or more shared databases such as the relationship database 140.

Importantly, a relationship management process 120 can be interposed between the managed resources 170 and the relationship database 140 to manage access to the relationship database 140 as new resource references and resources relationships are added to the relationship database 140. In this regard, as new resource references are added to the relationship database 140, additional relationship data can be derived from existing relationship data within the relationship database 140. Specifically, the relationship management process 120 can specify the relationship between different ones of the resources 170 and, in particular, resource dependencies. Accordingly, where a resource 170 such as resource 190A depends upon two other resources 190B, the relationship can be so specified in the relationship database 140. By comparison, where no dependencies exist among the resources 170, for instance the resources 180, no relationship will be recorded in the relationship database 140.

In either case, a hierarchy of resource relationships can be constructed within the shared, relationship database 140. Consequently, the impact of an event arising in a particular one of the resources 170 can be evaluated not only for its immediate impact on an SLA which directly implicates the particular one of the resources 170, but also for its immediate impact on an SLA which indirectly implicates the particular one of the resources 170 through a specifically referenced one of the resources 170 which depends upon the particular one of the resources 170. Accordingly, a more robust SLA impact analysis can arise in view of the present invention.

To that end, a modeling and evaluation process 130 can be communicatively coupled each to the relationship database 140, to the SLAs 150, and to the management applications 160. The modeling and evaluation process 130 can receive events 110A arising in the resources 170 and detected by the respective management applications 160. The modeling and evaluation process 130 can locate those resources 170 which are implicated by the events 110A. The hierarchy of resources in the relationship database 140 can be processed to identify not only those ones of the SLAs 150 which directly specify the specific ones of the resources 170 from which the events 110A arose, but also the SLAs 150 which indirectly specify the specific ones of the resources 170 by way of direct references to selected ones of the resources 170 which are related within the hierarchy to the specific ones of the resources 170.

Figure 2:
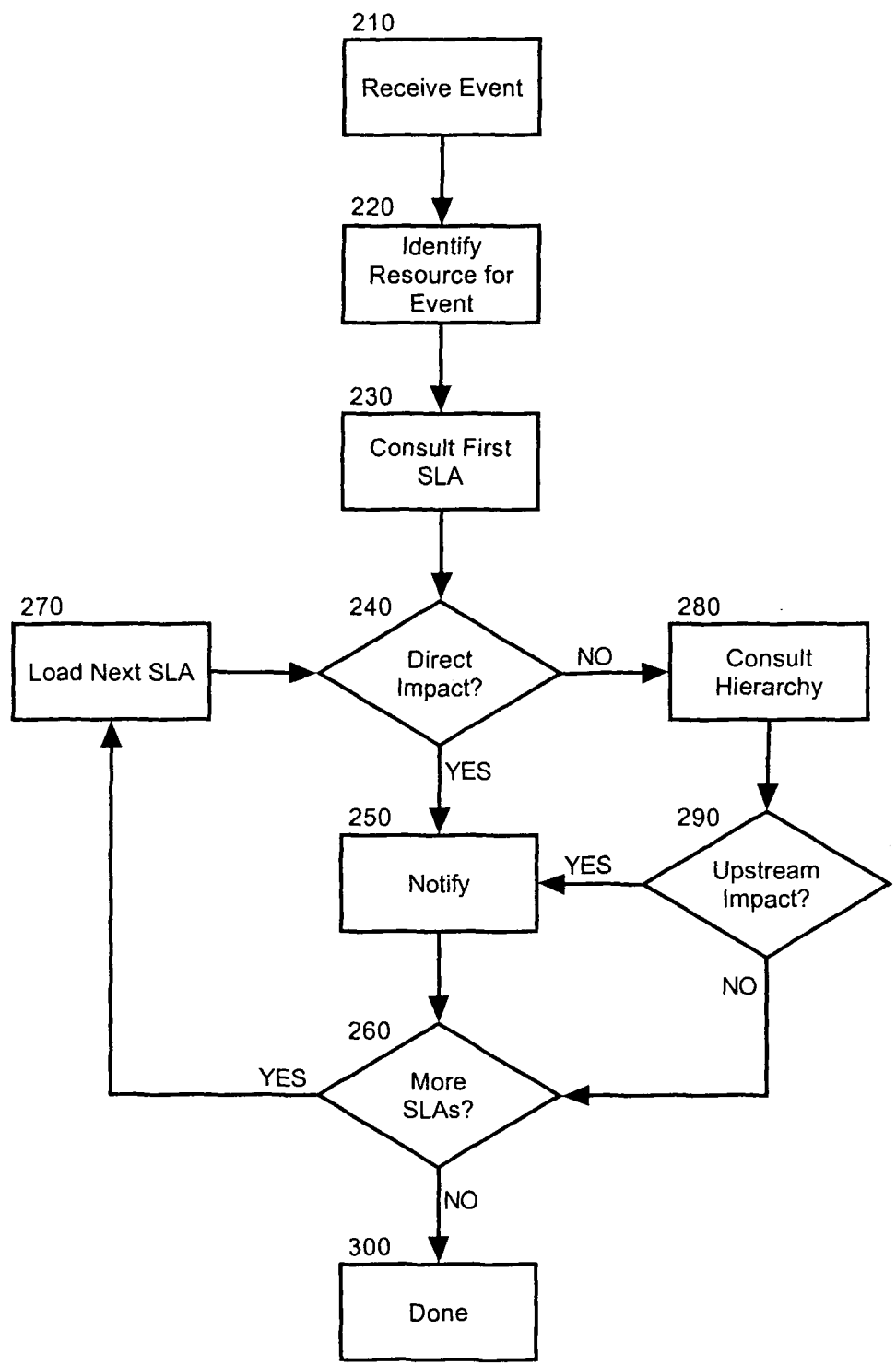

In more particular illustration of the operation of the modeling and evaluation system, FIG. 2 is a flow chart illustrating a process for performing a real-time SLA impact analysis in the service level monitoring system of FIG. 1. The process can begin in block 210 in which an event arising from an underlying resource can be received. In block 220, the underlying resource can be identified. Subsequently, in block 230 a first SLA can be referenced to determine in decision block 240 whether the SLA specifies the underlying resource directly. If so, in block 250 a notification can be formulated where the event can impact any one of the terms of the SLA. Otherwise, the process can continue through 280 and 290.

Specifically, in block 280, though no direct specification of other resources may be identified in the SLA, the hierarchy can be consulted to determine whether other resources depend upon the underlying resource. If, in decision block 290, an upstream impact can be identified, again in block 250 a notification can be formulated where the event can impact any one of the terms of the SLA. Regardless, however, it can be determined in block 260 whether additional SLAs remain to be analyzed. If so, in block 270 the next SLA can be loaded and the process can repeat through decision block 240. Otherwise the process can end in block 300.

Importantly, the foregoing process and system can be explained by way of a concrete example set forth not in a limiting manner, but in an exemplary manner. In an exemplary scenario, a server resource can depend upon both a disk resource and a database resource. The disk resource can be managed within a first management application, the database resource can be managed within a second management application, and the server resource can be managed within yet a third management application. Each of the management applications can report the underlying resources and their respective dependencies to the relationship database.

An SLA can be established based upon the server resource which requires a specific level of performance from the server resource. For instance, the SLA can specify a level of performance as follows:

Offering:
Server Availability
Peak 98% Available
Off-Peak 92% Available
Monthly Evaluation
SLA:
Resource=Server Resource When an event arises which calls into question the ability of the server resource to meet this term of the SLA, the modeling and evaluation process can recognize the immediate impact of the event and a notification can be generated accordingly. More importantly, however, when an event arises which calls into question the ability of the disk resource to perform adequately so as to prevent the server resource from meeting this term of the SLA, the modeling and evaluation system can recognize the dependency within the relationship database and a notification can be generated accordingly.

Notably, while in FIG. 1 the relationship database 140 has been illustrated as a stand-alone, single database, the invention is not so limited to the precise configuration of the relationship database 140, relationship management process 120, modeling and evaluation process 130 and the service level manager 100. In fact, in a preferred arrangement, a data warehouse can be coupled to the relationship database for a more robust storage scheme. Similarly, the functionality of the modeling and evaluation process 130 and the relationship management process 120 can be incorporated within the service level manager 100.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for performing a real-time service level agreement (SLA) impact analysis, the method comprising the steps of:
   detecting by a processor of the computer an event arising from a specific resource from amongst the different resources within a first SLA;
   identifying the specific resource for the detected event;
   analyzing the first SLA to identify different resources within the first SLA;
   determining whether based upon said event said specific resource cannot perform adequately enough so as to meet a term within the first SLA that directly specifies said specific resource;
   on condition that it is determined that the first SLA specifies the specific resource and that the specific resource in consequence of the event cannot perform adequately enough to meet the term within the first SLA, generating a notification in the memory of the computer, but otherwise consulting a hierarchy of resources to determine whether other resources in the hierarchy depend upon the specific resource and if so, also generating the notification;
   analyzing each of several different SLAs to identify different resources within the several different SLAs and further determining whether based upon said event said specific resource inhibits another different resource from performing adequately enough so as to meet a different term within the several different SLAs; and,
   generating the notification in the memory of the computer on condition that based upon said event said specific resource inhibits another different resource from performing adequately enough so as to meet a different term within the different SLAs but otherwise consulting a hierarchy of resources to determine whether other resources in the hierarchy depend upon the specific resource and if so, also generating the notification.

2. The method of claim 1, further comprising the step of establishing the hierarchy of resources within a shared database through which a relationship can be recognized between said specific resource and said another resource in said further determining step.

3. The method of claim 1, wherein said detecting event comprises the step of receiving an event from a management application charged with managing said specific resource.

4. A system of performing a real-time service level agreement (SLA) impact analysis comprising:
   a hardware processor configured to:
   detect an event arising from a specific resource from amongst the different resources within a first SLA;
   identify the specific resource for the detected event;
   analyze a first SLA to identify different resources within the first SLA;
   determine whether based upon the event the specific resource cannot perform adequately enough so as to meet a term within the first SLA that directly specifies said specific resource;
   on condition that it is determined that the first SLA specifies the specific resource and that the specific resource in consequence of the event cannot perform adequately enough to meet the term within the first SLA, generate a notification in the memory of the computer, but otherwise consult a hierarchy of resources to determine whether other resources in the hierarchy depend upon the specific resource and if so, also generating the notification;
   analyze each of several different SLAs to identify different resources within the several different SLAs and further determine whether based upon the event the specific resource inhibits another different resource from performing adequately enough so as to meet a different term within the several different SLAs; and,
   generate the notification on condition that based upon the event, the specific resource inhibits another different resource from performing adequately enough so as to meet the different term within the different SLAs but otherwise consult a hierarchy of resources to determine whether other resources in the hierarchy depend upon the specific resource and if so, also generate the notification.

5. The system of claim 4, wherein the hierarchy of resources is established within a shared database through which a relationship can be recognized between the specific resource and the another resource.

6. A non-transitory machine readable storage having stored thereon a computer program for performing a real-time service level agreement (SLA) impact analysis, the computer program comprising a routine set of instructions for causing the machine to perform the steps of:

detecting by a processor of the computer an event arising from a specific resource from amongst the different resources within a first SLA;

identifying the specific resource for the detected event;

analyzing the first SLA to identify different resources within the first SLA;

determining whether based upon said event said specific resource cannot perform adequately enough so as to meet a term within the first SLA that directly specifies said specific resource;

on condition that it is determined that the first SLA specifies the specific resource and that the specific resource in consequence of the event cannot perform adequately enough to meet the term within the first SLA, generating a notification in the memory of the computer, but otherwise consulting a hierarchy of resources to determine whether other resources in the hierarchy depend upon the specific resource and if so, also generating the notification;

analyzing each of several different SLAs to identify different resources within the several different SLAs and further determining whether based upon said event said specific resource inhibits another different resource from performing adequately enough so as to meet a different term within the several different SLAs; and, generating the notification in the memory of the computer on condition that based upon said event said specific resource inhibits another different resource from performing adequately enough so as to meet a different term within the different SLAs but otherwise consulting a hierarchy of resources to determine whether other resources in the hierarchy depend upon the specific resource and if so, also generating the notification.

7. The machine readable storage of claim 6, further comprising the step of establishing the hierarchy of resources within a shared database through which a relationship can be recognized between said specific resource and said another resource in said further determining step.

8. The machine readable storage of claim 6, wherein said detecting event comprises the step of receiving an event from a management application charged with managing said specific resource.

* * * * *